(12) United States Patent
Lichtinger (10) Patent No.: US 7,314,362 B2
(45) Date of Patent: Jan. 1, 2008

(54) HORIZONTAL INJECTION MOLDING MACHINE WITH TURNING DEVICE

(75) Inventor: Peter Lichtinger, Fürstenfeldbruck (DE)

(73) Assignee: Krauss-Maffei Kunststofftechnik GmbH, Müchen (DE)

( * ) Notice: Subject to any disclaimer, the term of this patent is extended or adjusted under 35 U.S.C. 154(b) by 0 days.

(21) Appl. No.: 11/278,023

(22) Filed: Mar. 30, 2006

(65) Prior Publication Data

US 2006/0177540 A1    Aug. 10, 2006

Related U.S. Application Data

(63) Continuation of application No. PCT/EP2004/011237, filed on Oct. 8, 2004.

(30) Foreign Application Priority Data

Oct. 9, 2003  (DE) .............................. 103 47 638

(51) Int. Cl.
*B29C 45/06* (2006.01)

(52) U.S. Cl. ...................... 425/112; 425/576

(58) Field of Classification Search ................ 425/112, 425/130, 134, 576

See application file for complete search history.

(56) References Cited

U.S. PATENT DOCUMENTS

| | | | | |
|---|---|---|---|---|
| 3,880,560 A | * | 4/1975 | Takahashi | 425/130 |
| 4,243,362 A | * | 1/1981 | Rees et al. | 425/130 |
| 4,726,558 A | * | 2/1988 | Ozone et al. | 248/68.1 |
| 4,734,023 A | * | 3/1988 | Nesch et al. | 425/130 |
| 5,773,049 A | * | 6/1998 | Kashiwa et al. | 425/576 |
| 6,139,305 A | * | 10/2000 | Nesch | 425/576 |
| 6,613,262 B1 | * | 9/2003 | Arend | 425/576 |
| 6,709,251 B2 | * | 3/2004 | Payette et al. | 425/576 |
| 7,018,189 B2 | * | 3/2006 | Wobbe et al. | 425/576 |
| 2003/0077354 A1 | | 4/2003 | Wohlrab | |

FOREIGN PATENT DOCUMENTS

DE    296 11 733 U    9/1996

(Continued)

OTHER PUBLICATIONS

Johannaber Friedrich, Michaeli, Walter: "Handbuch Spritzgiessen", Nov. 13, 2001, Carl Hansen Verlag, Munich, XP002313366, p. 506-509.

*Primary Examiner*—James P. Mackey
(74) *Attorney, Agent, or Firm*—Henry M. Feiereisen; Ursula B. Day (57) ABSTRACT

A horizontal injection molding machine includes a machine bed defining a longitudinal axis and two mold platens supported on the machine bed for movement in a direction of the longitudinal axis, whereby each of the mold platens carries a half-mold. Further provided is a turning device which carries at least two half-molds for interaction with the half-molds on the mold platens, and includes a base plate, which is fixedly mounted to the machine bed between the mold platens, a turntable, and a bearing unit supporting the turntable on the base plate on one side for rotation about a vertical axis. The half-molds of the turning device are hereby attachable on a base-plate distal side of the turntable. The mold platens are moved by a drive mechanism in relation to the turning device, and tie bars extend between the mold platens and are constructed to resist a clamping force.

17 Claims, 6 Drawing Sheets

FOREIGN PATENT DOCUMENTS

| | | |
|---|---|---|
| DE | 101 52 394 A | 5/2003 |
| EP | 1 306 186 A | 5/2003 |
| FR | 1 559 051 A | 3/1969 |
| JP | 06 254906 A | 9/1994 |
| WO | WO 00/12284 A | 3/2000 |
| WO | WO 01/10624 A | 2/2001 |
| WO | WO 02/40196 A | 5/2002 |
| WO | WO 03/013824 A | 2/2003 |

* cited by examiner

HORIZONTAL INJECTION MOLDING MACHINE WITH TURNING DEVICE

CROSS-REFERENCES TO RELATED APPLICATIONS

This application is a continuation of prior filed copending PCT International application no. PCT/EP2004/011237, filed Oct. 8, 2004, which designated the United States and on which priority is claimed under 35 U.S.C. §120, and which claims the priority of German Patent Application, Serial No. 103 47 638.5, filed Oct. 9, 2003, pursuant to 35 U.S.C. 119(a)-(d), the contents of which are incorporated herein by reference.

BACKGROUND OF THE INVENTION

The present invention relates, in general, to a horizontal injection molding machine with a turning device rotatable about a vertical axis for half-molds.

A horizontal injection molding machine of this type is known, for example, from WO 03/013824 having a turning device provided for the half-molds and supported in a stationary frame which is mounted to a machine bed and traversed by the tie bars of the injection molding machine. This arrangement has the drawback that, on one hand, only a two-step operation is possible as a consequence of the frame construction for the stationary tuning unit, since the half-molds which are supported on the turning device are inaccessible from the side so that there is no possibility to carry out from the side of the machine additional processing steps such as, for example, removal of finished molded parts or placement of inserts in half-molds that still undergo molding, while injection just takes place in further mold pairs. In addition, removal of the molded parts requires access between both half-molds, i.e. there is no easy accessibility. A further drawback of this apparatus is the limitation of the maximum size of the turning half-molds that can be used as a result of the size of the frame. This is substantially restrictive especially when large-area injection-molded part are produced.

JP 06254906 A also discloses an injection molding machine with turning device, having tie bars that are extend through a frame of the turning device. The moving mold platens are moved here via hydraulic drive cylinders which are articulated to the side of the frame of the turning device and must be attached to the mold platens in symmetry to a longitudinal axis of the injection molding machine to ensure sufficient centering. In an opening position, the mold platens can be moved apart far enough to allow withdrawal of the tie bars from one of the two mold platens. This apparatus has also the drawback that the size of the frame limits the size of the useable half-molds, and that furthermore accessibility to the molds is made difficult by the frame and a two-step operation is no longer possible.

It would therefore be desirable and advantageous to provide an improved horizontal injection molding machine which obviates prior art shortcomings and is useable with large-sized half-molds even for large-scale machines, while allowing for a rotary mode as well as reversible four-step mode, and which is also applicable in a clean room environment, while still being reliable and stable in operation and able to produce highly precise, large-size multicomponent plastic parts.

SUMMARY OF THE INVENTION

According to one aspect of the present invention, a horizontal injection molding machine includes a machine bed defining a longitudinal axis, two mold platens supported on the machine bed for movement in a direction of the longitudinal axis, each of the mold platens carrying a half-mold, a turning device constructed to carry at least two half-molds for interaction with the half-molds on the mold platens, wherein the turning device includes a base plate, which is fixedly mounted to the machine bed between the mold platens, a turntable, and a bearing unit supporting the turntable on the base plate on one side for rotation about a vertical axis, with the half-molds attachable on a base-plate distal side of the turntable, a drive mechanism for moving the mold platens in relation to the turning device, and tie bars extending between the mold platens and constructed to resist a clamping force.

The present invention resolves prior art problems by providing a turning device having a base plate which is disposed stationarily on the machine bed between the two moving mold platens, without engaging the tie bars of the injection molding machine. Supported on this base plate for rotation about a vertical axis is a turntable. This turntable may be driven, for example, by a pivot (rotor) which extends along the rotation axis through the base plate. A hydraulic or electric motor is preferably used as driving mechanism and engages the turntable or pivot, with the driving operation realized via a gear in mesh with a ring gear provided on the turntable. The transmission has to be suited in each case to the application at hand.

According to another feature of the present invention, the turning device may include a carrier assembly disposed on the turntable for supporting the half-molds.

As the turning device is completely separated from the tie bars in accordance with the invention, a respectively constructed horizontal injection molding machine does not exhibit the limitations as known from the state of the art. In particular, half-molds of any size can be used on the carrier assembly, without regard to the dimension of a support frame. The only limitation is to make sure that the half-molds do not touch the tie bars during rotation. As long as they have a length dimension which is smaller than a vertical distance between the tie bars of the injection molding machine, the width and depth of the half-molds is only limited by the available space, when the mold platens are open, i.e. the opening stroke of the mold platens is the limiting factor.

As the turning device is supported solely on the machine bed, the supply of media to the rotatably supported half-molds is additionally simplified. Cooling water, oil, air can be conducted through rotary feedthroughs, with the connection being located in the area of the machine bed, and cables for transmitting or tapping signals are also easy to implement. This can be appreciated in particular when using such injection molding machines with turning device in a clean room environment. As the moving parts of the turning device are movably supported only on the base plate situated underneath the molds and no further underpinning parts are required, the use of a continuous clean air flow box is possible to effect a laminar air stream above the machine to the machine bed so that rubbed-off particles or similar contaminants are prevented from contacting the produced injection-molded parts.

By suitably dimensioning the base plate as well as the bearing unit of the turntable, the turning device can be made stable enough, even when very large half-molds of substantial weight are involved. Care should be taken for respectively adjusting the half-molds on the carrier assembly. In particular the rotation axis should extend through the gravity center of the turning device including half-molds in order to ensure highest precision of the rotation movement.

According to another feature of the present invention, the carrier assembly may include a carrier platen which is secured to the turntable and constructed to support the two half-molds which can be brought alternatingly into contact with various half-molds supported on the moving mold platens. It is, however, also possible to always engage the same half-molds. Each rotation of the turning device can take place only when the molds are open, i.e. after the moving mold platens are moved away from the turning device.

As an alternative, the carrier assembly may include a carrier block constructed for attachment of four half-molds of the turning device. A horizontal injection molding machine according to the invention can then be operated in four-step mode.

According to another feature of the present invention, the turning device may include a height adjustment for the half-molds of the turning device in relation to the half-molds of the mold platens. In this way, the half-molds of the turning device, which are mounted on the carrier assembly, can be adjusted precisely to the height of the half-molds, which are retained on the moving mold platens, for cooperation therewith to form a mold cavity. Adapter plates mounted to the turntable and supporting the half-molds thereon may be provided to enhance stability.

Closing or opening of the molds, i.e. shifting the mold platens in relation to the turning device of the horizontal injection molding machine according to the invention may involve the use of at least two driving cylinders which attach to the mold platens independently from the tie bars which are provided for application of the clamping force. Of course, the displacement may also be implemented by other mechanisms, for example via electrically driven spindle drives.

Construction of a horizontal injection molding machine in the form of a two-platen machine results in a particularly compact configuration. Of course, any other construction known in the prior art may be used, for example an injection molding machine with four platens, of which two are stationary support platens, and two are moving mold platens, with the turning device being arranged between the two moving platens.

In case of a two-platen machine, at least one driving cylinder can be articulated directly to one of the two mold platens and to the stationary base plate of the turning device, or directly to the machine bed, whereas the at least one further driving cylinder is mounted to the other moving mold platen and the stationary base plate or machine bed.

According to another feature of the present invention, the drive mechanism may include for each of the mold platens two driving cylinders which are arranged in opposing relationship with respect to the longitudinal axis and are operatively connected to a lower area of the mold platens. In this way, the space between tie bars is cleared for processing and removal operations. The symmetric arrangement in relation to the longitudinal machine axis positively affects the stability and centering of the machine.

According to another feature of the present invention, the tie bars may be attached to one of the mold platens through intervention of a clamping pressure application means, while being movably supported in the other one of the mold platens. This may involve for example a configuration of the one mold platen in the form of a so-called sandwich platen, whereby this moving mold platen is comprised of a support platen, which is securely connected to the tie bars, and a mold carrier platen, which is movably supported on the tie bars, between which hydraulic pressure plungers for example are disposed for application of the clamping force.

Movably supported on the other one of the mold platens are the tie bars which extend therethrough at least in one clamping position and engage at least partially or temporarily continuously in the opened state. It may be advantageous to continuously have the tie bars engage the mold platen which movably supports them in order to facilitate a centering of the mold platens. Currently preferred, however, is a support the mold platens for longitudinal movement at slight tolerance in linear guides or slideways so as to be prevented form tilting so that the tie bars are not required to provide an additional guide function. The stroke of the opening motion can thus also be selected such as to prevent tie bar ends from engaging the mold platen so that accessibility to the half-mold mounted on this mold platen is improved.

According to another feature of the present invention, a locking mechanism may be provided for locking the tie bars to the other one of the mold platens that movably supports the tie bars. Suitably, the ends of the tie bars are provided with sawtooth-shaped grooved recesses which cooperate with pairs of toothed jaws which can be operated and are disposed on the side of the mold platen facing away from the mold-half and which engage in corresponding recesses of the tie bars, when the molds are closed, to thereby lock the mold platens. Of course, other locking mechanisms known to the artisan may also be applicable.

According to another feature of the present invention, a precise centering of the respectively cooperating half-molds, when a mold platen with half-mold approaches the turning device with the respectively supported half-mold, may be realized for example by the use of a centering pin which is provided on one of the half-molds and which interacts with a respective recess in the other half-mold.

The configuration of the horizontal injection molding machine according to the invention, in which the carrier assembly is constructed as a vertical carrier platen supported on the turntable and having front and backsides, each allowing attachment of a respective half-mold, is suitable for example for production of large-sized plastic parts which should be made by a two-component process. The horizontal injection molding machine is hereby operated in two-step mode, whereby in a first step a base part of the plastic part is molded from a first component in a mold formed from half-molds mounted on the carrier platen and the mold platen, when the injection molding machine is closed. The injection molding machine is then opened, i.e. both mold platens are moved away from the turning device and the turning device rotates about 180° so that the half-mold which includes the base part coincides with the half-mold secured on the other mold platen. In the second step, a second component in correspondence with the intended mold configuration is molded onto the base part, produced in the preceding step, whereas a new base part is produced by the mold disposed on the other side of the support platen. As the mold platens are again opened, the finished two-component plastic part is removed. This may be realized advantageously also in a rotation position of the turning device which has traveled by 90° in relation to an injection process. Thus, it is possible to access the opened half-mold between the tie bars head-on from the machine side. The removal time prolongs hereby the cycle-time. This process is especially suitable for very large plastic parts in which the base area swept by the half-molds mounted to the support platen is very large.

The horizontal injection molding machine according to the invention may also include a carrier assembly in the form of a carrier block which carries four half-molds. This configuration is suitable in particular for application of a so-called four-step process, i.e. for making large-size plastic parts for example which are made by a two-component process and in which inserts are placed after the first step, i.e. after molding a base part. Operation of an injection molding machine with such a carrier block on the turntable of the turning device proceeds in such a way that in a first step a base part is molded when the injection molding machine is closed, in the second step following a 90° rotation of the turning device with the carrier block carrying the half-molds, the inserts are deposited from the side of the injection molding machine by robots for example, in a subsequent step, the turning device is again rotated further by 90° to inject a second component into the mold with the base part and the insert(s). During this step, a further base part is molded with the first plastic component in the diagonally opposite mold. In the fourth step, the turning device rotates further by 90° so that the finished multicomponent part can be removed preferably at a removal station with a robot for example or a similar apparatus. At the same time, the inserts are inserted on the opposite side of the carrier block into the half-mold, which contains the base part, and a base part and a finished part, respectively, are molded in the neighboring half-molds. As the four-step mode involves a parallel operation of removal and insertion while an injection process is executed at the same time, the removal and the insertion do not prolong the cycle time.

There is also the possibility to advantageously produce large-area single-component plastic parts with a horizontal injection molding machine according to the invention, with a carrier block carrying four or two identical half-molds which cooperate with two further half-molds secured to the moving mold platens. Thus, in each closing position of the injection molding machine, two identical parts can be produced, after opening the mold platens, the rotation direction is adjusted by 90°, and the mold platens are again brought into a closing position. While two further identical parts are made, the parts made in a preceding step are removed laterally between the tie bars of respective removal assemblies from the half-molds carrying them. In this mode of operation, the turning device may either be rotated further by 90° in each step, i.e. operated in rotary mode, whereby four identical half-molds must be situated on the carrier block. In the event, the carrier block carries two different types of half-molds in opposite relationship, the turning device indexes by 90° in reversible mode, i.e. per step two different parts are molded parallel, in the next step two different parts are again molded with the carrier block rotated by 90°, while the parts being produced in the preceding step can be removed laterally between the tie bars. In the following cycle, the turning device rotates back so that again two different parts can be produced whereas the previously produced ones are removed. In this mode of operation, a great number of plastic parts can be made in very short cycle time.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
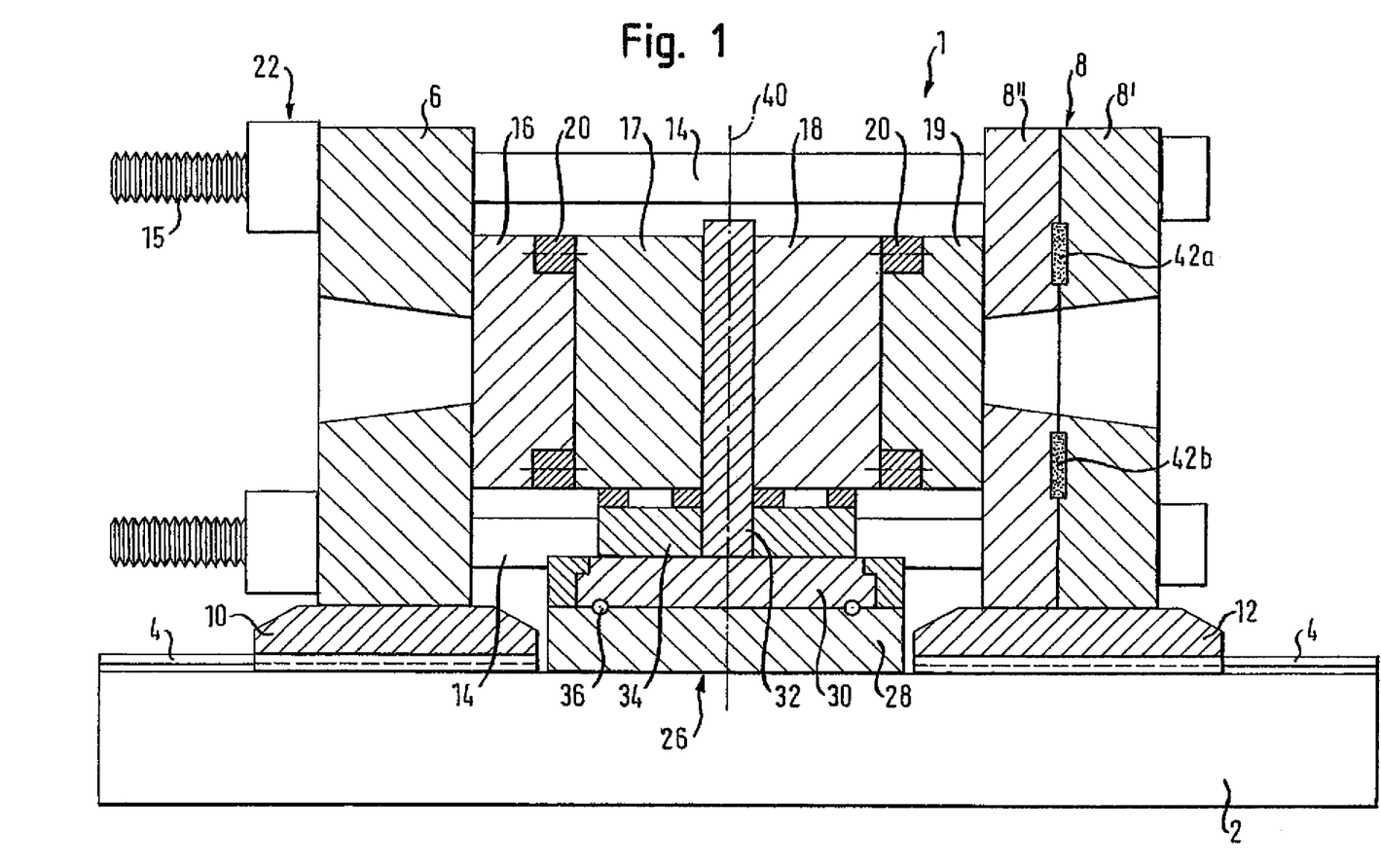
FIG. 1 shows a longitudinal section of a schematic illustration of a two-platen injection molding machine in closed state along the longitudinal machine axis.

Turning now to the drawing, and in particular to FIG. 1, there is shown a schematic longitudinal section of an injection molding machine according to the present invention, generally designated by reference numeral 1 and defining a longitudinal axis. The injection molding machine 1 has a machine bed 2 for support of two moving mold platens 6, 8 which have sliding shoes 10, 12 for guidance in linear guides 4 in such a manner that the mold platens 6, 8 are able to move in a direction of the longitudinal axis but are prevented from tilting.

The mold platens 6, 8 are connected by tie bars 14 of which only the two tie bars behind the section plane are visible and whose course through the mold platens 6, 8 is indicated in FIG. 1. The mold platen 8 on the right-hand side of FIG. 1 is constructed as a so-called sandwich platen and has two plates disposed at slight parallel spacing. One of the plates is a support platen 8' for attachment of the tie bars 14, and the other is configured as mold carrier platen 8" for movable support on the tie bars 14. Hydraulic pressure rams or pressure pads 42a and 42b are located between the support platen 8' and the mold carrier platen 8" for application of the clamping force, when the mold platens 6, 8 are clamped.

Figure 2:
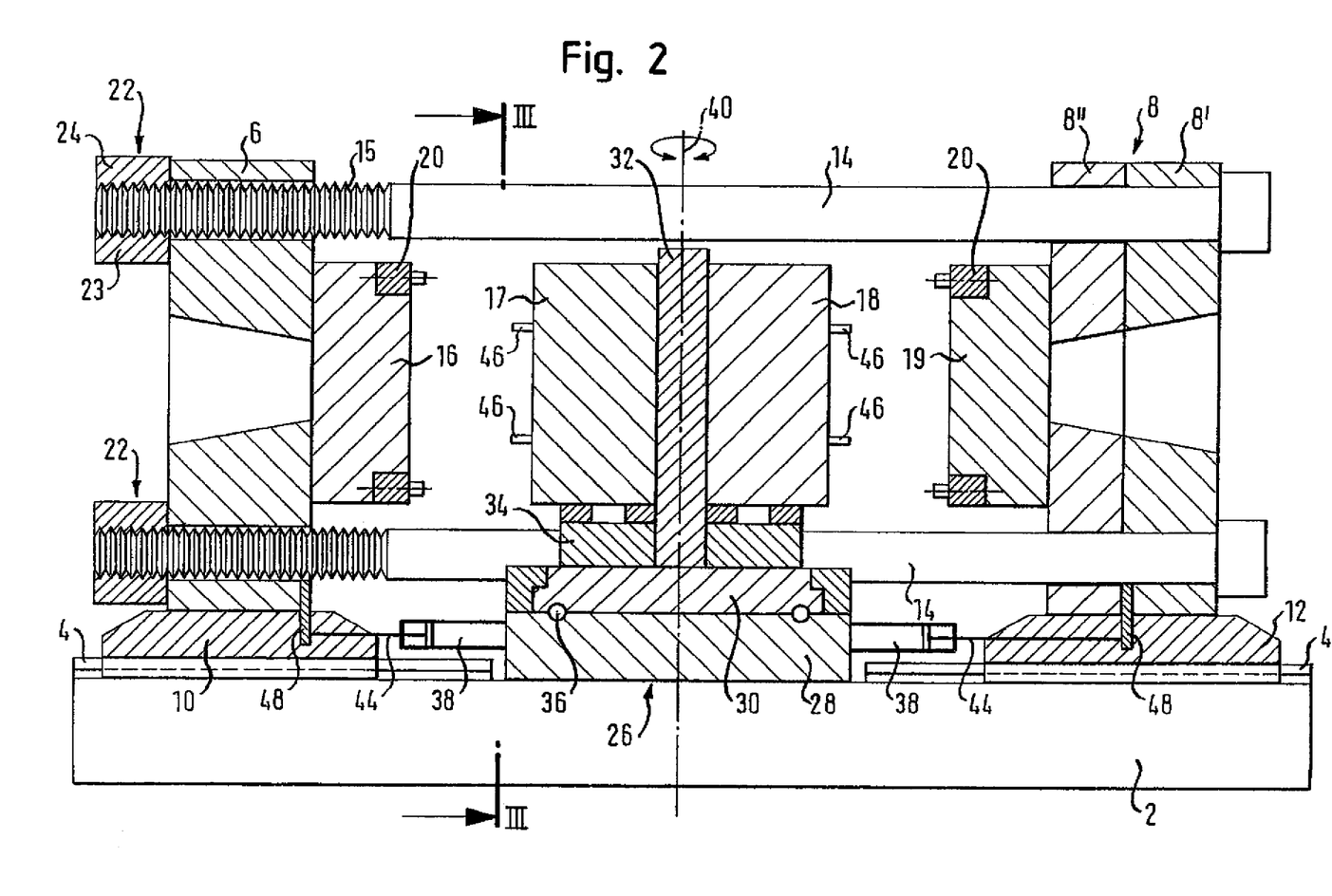
FIG. 2 shows a longitudinal section of the injection molding machine of FIG. 1 in open state, with a section plane set back on the area of the mold platens.

The tie bars 14 are movably supported in the left mold platen 6 and may be withdrawn completely from the mold platen 6, when the opening motion is especially wide. End pieces on the left-hand side of the tie bars 14 are profiled, for example by way of sawtooth-shaped grooves 15. Provided on the outside of the mold platen 6 is a locking mechanism 22 which, as shown in FIG. 2, includes two half-shell shaped, controllable jaws 23, 24 per tie bar 14 for engagement with the grooved profile 15 of the tie bars 14 in the locked position. This locking mechanism can be actuated hydraulically for example.

The mold platens 6, 8 carry half-molds 16 and 19, respectively, which cooperate with associated half-molds 17 and 18, respectively, to define mold cavities for receiving plasticized material. The material is supplied via recesses, not designated, which are formed in mid-section of the mold platens 6, 8 and allow a linkage of the mold cavities to unillustrated injection units. These injection units may be movably supported either on the same machine bed or on separate machine beds connected to the left and right in FIGS. 1 and 2 and docked respectively only when the mold platens 6, 8 are clamped. This is advantageous especially when injection units are involved with high plasticizing output. The injection units may, however, also flange-mounted directly to the half-molds 6, 8 and moved conjointly therewith.

Located between the two mold platens 6, 8 is a turning device 26, which is securely fixed to the machine bed 2 and by which the half-molds 17, 18 can be brought into contact alternatingly with the half-molds 16, 19 secured to the mold platens 6, 8. It is, however, also possible to have each half-mold 17, 18 respectively cooperate with a mold half 16, 19, mounted to a mold platen 6, 8, whereby the use of the turning device 26 facilitates handling during removal and/or mounting of the half-molds.

The turning device 26 has a stationary base plate 28 which is fixedly connected to the machine bed 2 and supports a turntable 30 for rotation about a vertical rotation axis 40 by means of a bearing unit. The bearing unit may be implemented, for example, via ball bearings 36 and a bearing pin which however is not shown in more detail and arranged along the rotation axis 40. The bearing pin may also be configured as a rotary feedthrough and constructed with connections for a coolant and/or heating medium. Fixedly arranged on the turntable 30 is a mold carrier platen 32 which rotates jointly with the turntable 30 and is secured to the half-mold 17, 18. In order to ensure a stable height support of the half-molds 17, 18 on the mold carrier platen 32, one or more adapter plates 34 may be placed between the turntable 30 and the half-molds 17, 18 for support of the half-molds 17, 18 on the turntable 30. In general, care should be taken that the gravity center of the turntable 30 and the supported half-molds 17, 18 as well as the adapter plates 34 extends on the rotation axis 40 so as to realize high stability of the turning device 26. The turning device 26 may also be supported in a separate frame and connected solely to the machine bed 2. Moreover, the half-molds 17 and 18 may also be mounted directly on the adapter plate 34 or the turntable 30.

Figure 6:
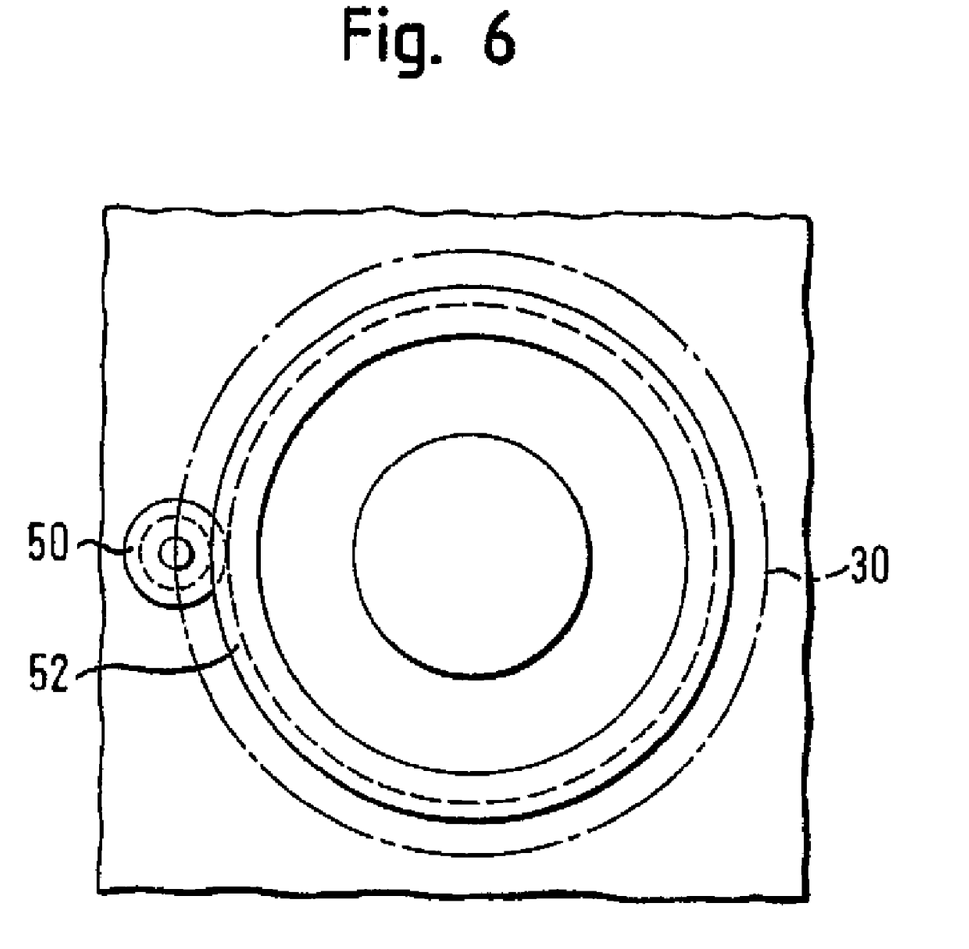
FIG. 6 shows a schematic illustration of a drive of the turntable.

The turning device 26 is caused to rotate by an electric or hydraulic motor, for example via a gear 50 which engages a ring gear 52 provided on the turntable 30, as is shown in particular in FIG. 6. When the desired position has been reached, the turning device 26 is fixed in the desired position by a locking mechanism which is not shown in greater detail.

The horizontal injection molding machine 1 of FIG. 1 is shown in FIG. 2 with the mold platens 6, 8 being moved apart, whereby the section plane extends in the area of the turning device 26 on the longitudinal axis and is set back in the area of the moving mold platens to the position of the tie bars 14, with the tie bars 14 not shown as sections for ease of illustration. Depicted schematically in FIG. 2 are also driving cylinders 38 which are secured to the stationary base plate 28 and have piston rods 44 fixed to the moving mold platens 6, 8. The piston rods 44 can be attached via fastening tabs 48 which can be provided on the underside of the mold platens 6 and 8', or the mold platens have protrusions which project downwards in this area. Provided on the half-molds 16, 19, which are mounted to the mold platens, are opening cylinders 20 for rapidly opening the molds 16, 17, and 18, 19, respectively. These opening cylinders 20 may, for example, be operated hydraulically and may be provided alternatingly on the rotatably half-molds 17, 18. Optionally, the half-molds 17 and 18 may also be provided with centering bolts 48 which engage corresponding bores in the half-molds 16 and 19, when the clamping unit closes.

Figure 3:
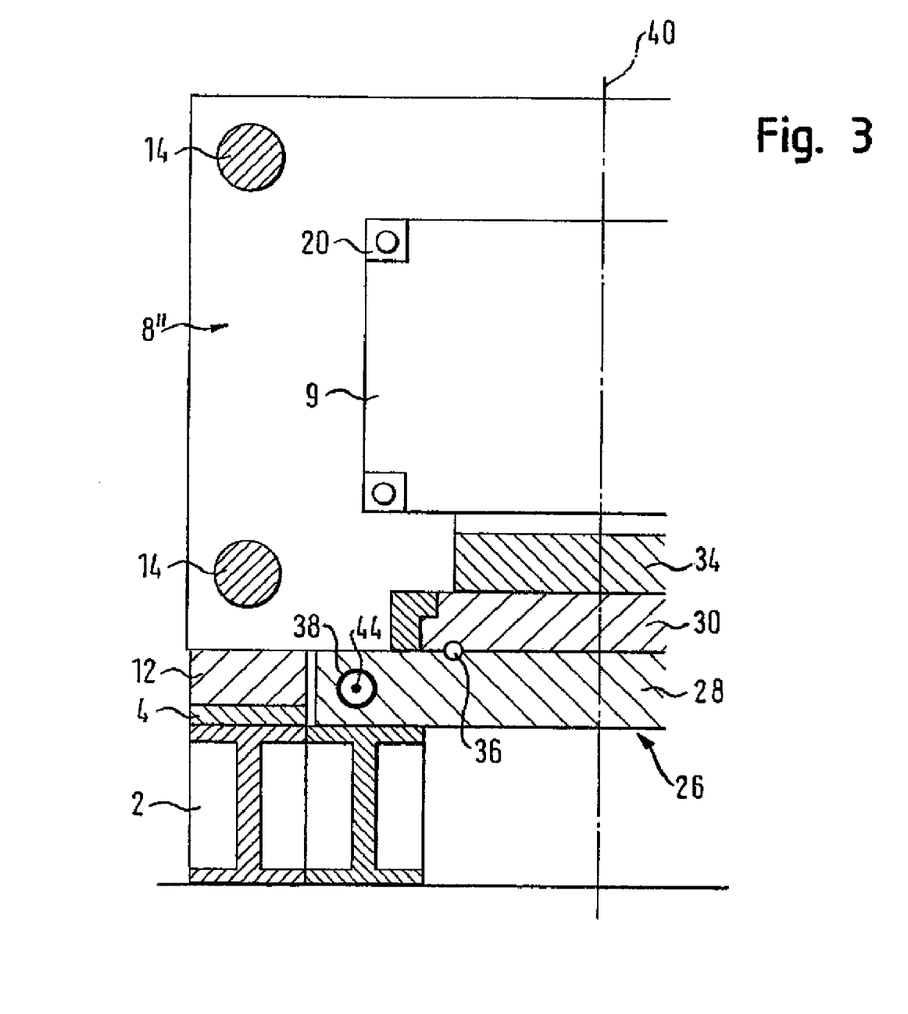
FIG. 3 shows a schematic partial sectional view of the injection molding machine, taken along the section line III-III in FIG. 2.

FIG. 3 is a partial sectional view of the injection molding machine 1, taken along the section line III-II in FIG. 2, with the injection molding machine extending in symmetry to a plane oriented vertical through the longitudinal machine axis. For better illustration despite the top view as a result of the section plane, the base plate 28, the turntable 30 and the adapter plate 34 are shown hatched. The moving mold platen 8" is traversed at the top and bottom by the tie bars 14. Provided on the stationary base plate 28, which is supported on the machine bed 2, are driving cylinders 38 disposed to the left and right of the longitudinal machine axis (see also FIG. 2) and having piston rods 44 attached to the moving mold platen 6. Likewise, driving cylinders 38 and piston rods 44 are arranged between the base plate 28 and the moving mold platen 8'. As they are positioned in FIG. 3 behind the turning device 26, these driving cylinders are not visible. By means of the driving cylinders 38, the moving mold platens 6, 8 travel in relation to the stationary turning device 26 on the machine bed 2 in order to implement the opening and closing motions of the molds 16, 17, 18, 19 of the injection molding machine 1. Optionally, further driving cylinders may further be provided on one or both sides of the base plate 28. If need be, it is also possible to provide only one driving cylinder 38 on both sides of the base plate 28, preferably in a vertical plane to the longitudinal machine axis, i.e. secured in midsection to the base plate 28. Instead of the hydraulic drives, also spindle drives may be provided for moving the moving mold platens 6 and 8.

Figure 4:
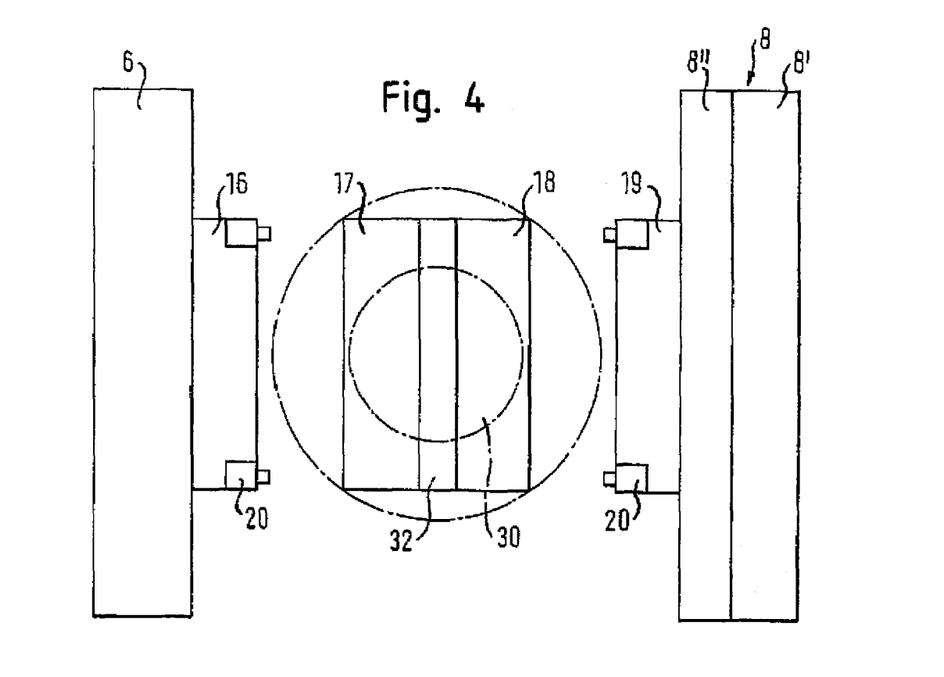
FIG. 4 shows a schematic top view of an injection molding machine according to the invention, with the turning device having a carrier platen.

FIG. 4 shows schematically a top view of an injection molding machine 1 according to FIG. 2. Mounted to the mold carrier platen 32 are half-molds 17, 18. The outer rotation circle swept by the half-molds 17, 18 during rotation of the turning device 26 is marked in dash-dot pattern and must be kept clear, when the mold platens 6, 8 are open. In addition, care must be taken to prevent a contact of the half-molds 17, 18 with the tie bars 14, not shown here, during a rotation motion. The turntable 30 situated underneath the carrier platen 32 is also shown in dash-dot patterns for clarity.

Figure 5:
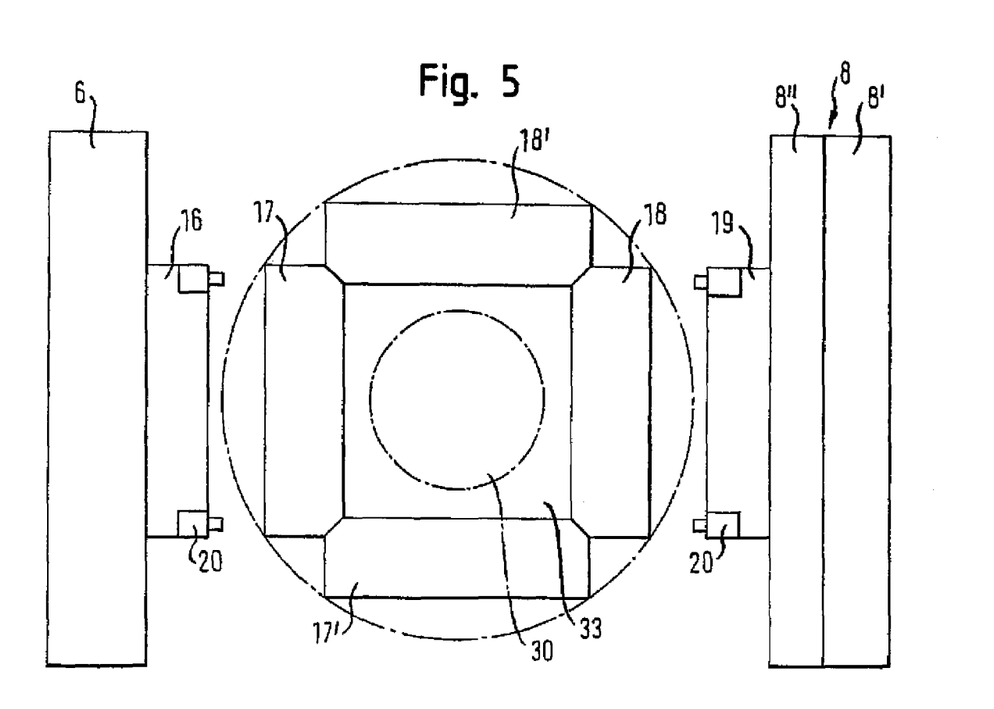
FIG. 5 shows a schematic top view of an injection molding machine according to the invention, with the turning device having a carrier block.

FIG. 5 shows like FIG. 4 a schematic top view of an injection molding machine, with the difference residing in the provision of a carrier block 33 as mold carrier assembly. The carrier block 33 is supported on the turntable 30, shown dotted in the center, for attachment of the four half-molds 17, 17', 18, 18' so that the horizontal injection molding machine according to the invention can be operated in four-step mode. As shown by the broken outer circle, the radius of this arrangement as swept by the half-molds 17, 17', 18, 18' is greater than upon use of only two half-molds, as in FIG. 4. Accordingly, the stroke of the opening motion of the moving mold platens 6, 8 must be selected greater, when using a carrier block 33.

When operating an injection molding machine 1 according to the invention, the turning device 26 is actuated and turned until the half-molds 17, 17', 18, 18', supported on the mold carrier platen 32 or the mold carrier block 33, have reached a desired position in which they coincide with the half-molds 16 and 19, respectively, which are supported on the moving mold platens 6, 8. In this position, the turning device 26 is locked, and the moving mold platens 6, 8 are caused to move to a closing position, when the driving cylinders 38, which attach in symmetry to a lower area of the mold platens 6, 8, are actuated, for interaction of the half-molds 16 and 19, respectively, with the confronting half-molds 17 and 18, respectively, which are supported by the turning device 26. In order to ensure a precise coincidence of the half-molds, at least one centering bolt 46 on one of the two half-molds engages a bore of the respectively confronting half-mold.

As soon as the mold platens 6, 8 have reached the closing position, the locking jaws 23, 24 of the locking system 22 are actuated to thereby clamp the mold platens 6, 8 with one another. Subsequently, the pressure cylinders or pressure pads 42*a* and 42*b* between the support platen 8' and the mold carrier platen 8" are actuated to apply the clamping pressure, injection units are docked onto the molds 16, 17 and 18, 19, respectively, and an injection process takes place. After completed injection process and conclusion of a possible dwell pressure phase, the injection units are moved away from the mold platens 6, 8, locking action by the locking system 22 is released, and the opening cylinders 20 are actuated to thereby open the half-molds 16, 17; 18, 19. The mold platens 6, 8 travel hereby to the opening position by means of the driving cylinders 38.

Through rotation of the turning device 26 by 90°, the half-molds 17, 18 which still contain the produced injection-molded part, can be so positioned as to be easily accessible from the machine side. Depending on the mode of operation, finished parts can, for example, be removed or inserts may be placed on base parts molded in a first component, and several parts can be molded simultaneously, when using a carrier block.

The present invention enables simple production of even large-size and in particular large-area plastic parts using single-component or multicomponent injection molding, whereby it is especially advantageous that the half-molds can be accessed head-on from the side of the injection molding machine and there is no limitation with respect to the radius swept by the rotatably supported half-molds as a consequence of a frame in surrounding relationship to the turning device. Am injection molding machine according to the present invention is applicable also for the use in a clean-room environment as the moving parts, such as for example the driving cylinders 38 and the gear 50, are arranged only in a lower region of the turning device 26 so as to allow expulsion of contaminating dust or emitting particles through use of a flowbox in a preferred direction in the absence of any contact with the half-molds or produced injection-molded parts.

Figure 7:
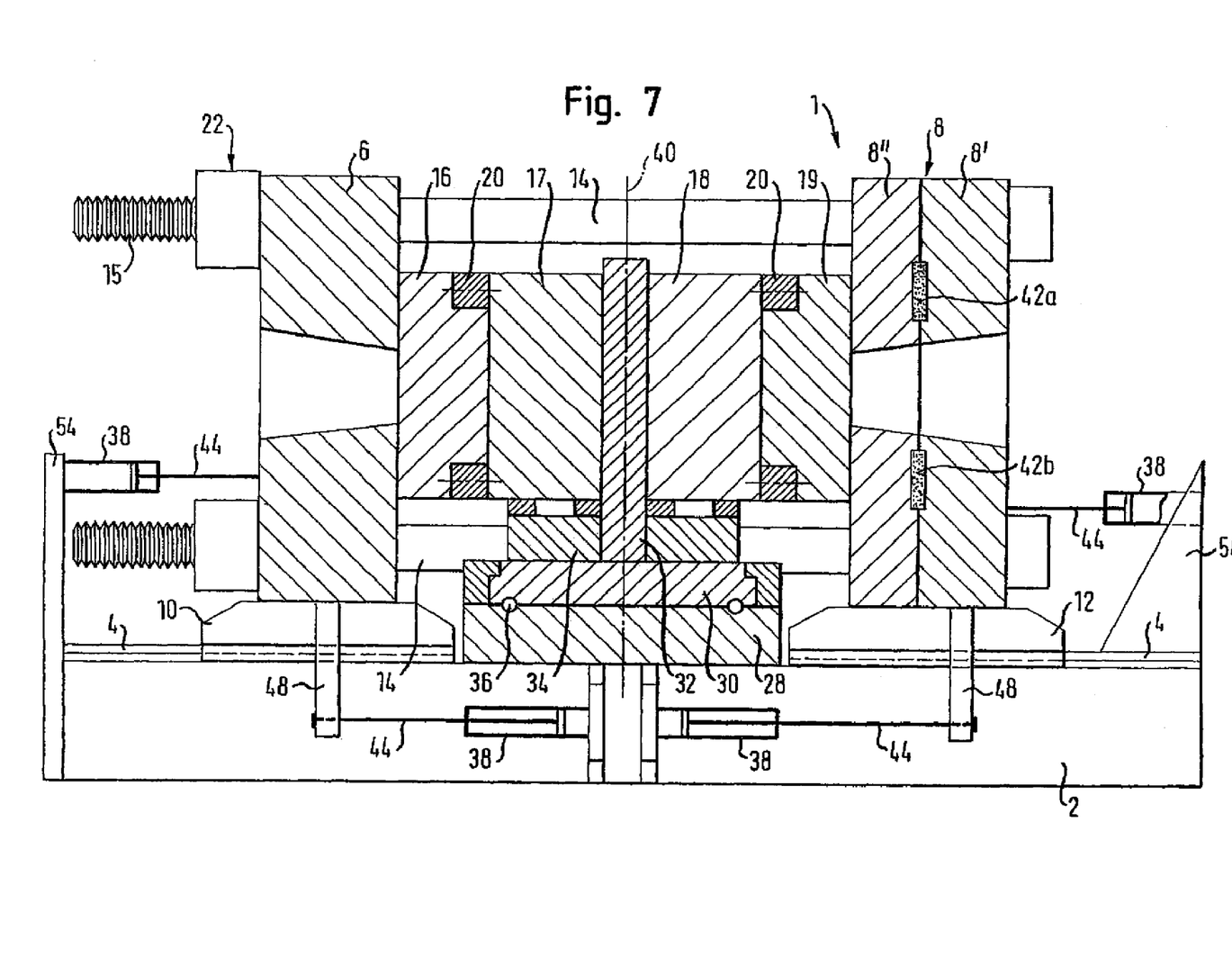
FIG. 7 shows a schematic illustration of a further variation for attachment of driving cylinders.

FIG. 7 shows further a variation for attachment of the driving cylinders 38. For example, the driving cylinders 38 may be secured underneath (as shown) or laterally of the base plate 28 on the machine bed 2, and the piston rods 44 may be secured to respectively long fastening tabs 48. The driving cylinders 38 may, however, also be attached to support elements 54 which are positioned behind the mold platens and connected to the machine bed 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

The invention claimed is:

1. A horizontal injection molding machine, comprising:
   a machine bed defining a longitudinal axis;
   two mold platens supported on the machine bed for movement in a direction of the longitudinal axis, each of the mold platens carrying a half-mold;
   a turning device constructed to carry at least two half-molds for interaction with the half-molds on the mold platens, said turning device including a base plate, which is fixedly mounted to the machine bed between the mold platens, a turntable, and a bearing unit supporting the turntable on the base plate on one side for rotation about a vertical axis, with the half-molds attachable on a base-plate distal side of the turntable;
   a drive mechanism for moving the mold platens in relation to the turning device; and
   tie bars extending between the mold platens and constructed to resist a clamping force.

2. The horizontal injection molding machine of claim 1, wherein the turning device includes a carrier assembly disposed on the turntable for supporting the half-molds.

3. The horizontal injection molding machine of claim 2, wherein the carrier assembly includes a carrier platen secured to the turntable and constructed to support the two half-molds.

4. The horizontal injection molding machine of claim 2, wherein the carrier assembly includes a carrier block constructed for attachment of four half-molds of the turning device.

5. The horizontal injection molding machine of claim 1, wherein the turning device includes an adjustment means for adjusting a height of the half-molds of the turning device in relation to the half-molds of the mold platens.

6. The horizontal injection molding machine of claim 5, wherein the adjustment means includes a plurality of adapter plates constructed for placement between the turntable and the half-molds, whereby the adapter plates and the half-molds are placed into one-to-one correspondence.

7. The horizontal injection molding machine of claim 1, wherein the drive mechanism includes at least two hydraulic driving cylinders operatively connected to the mold platens.

8. The horizontal injection molding machine of claim 1, constructed as two-platen machine.

9. The horizontal injection molding machine of claim 7, wherein the driving cylinders are articulated directly onto the mold platens and the stationary base plate.

10. The horizontal injection molding machine of claim 1, wherein the drive mechanism includes for each of the mold platens two driving cylinders which are arranged in opposing relationship with respect to the longitudinal axis and are operatively connected to a lower area of the mold platens.

11. The horizontal injection molding machine of claim 1, wherein the tie bars are attached to one of the mold platens through intervention of a pressure application means for applying the clamping pressure, while movably supported in the other one of the mold platens.

12. The horizontal injection molding machine of claim 1, wherein the one of the mold platens is a sandwich platen, comprised of a support platen, which is securely connected to the tie bars, and a mold carrier platen, which is movably supported on the tie bars.

13. The horizontal injection molding machine of claim 11, further comprising a locking mechanism for locking the tie bars to the other one of the mold platens.

14. The horizontal injection molding machine of claim 13, wherein the locking mechanism includes a toothed jaw assembly mounted to the other one of the mold platens and actuatable for engagement in recesses of the tie bars, when the mold platens are closed, to thereby lock the mold platens in place.

15. The horizontal injection molding machine of claim 11, wherein the tie bars extend into the other one of the mold platens to effect a centering of the mold platens.

16. The horizontal injection molding machine of claim 1, wherein the turntable rotates about a rotation axis which extends through a gravity center of the turning device with the half-molds.

17. The horizontal injection molding machine of claim 1, further comprising a linear guide assembly for supporting the mold platens to move in direction of the longitudinal axis at tolerance.

* * * * *